US007620912B1

United States Patent
Benson et al.

(10) Patent No.: US 7,620,912 B1
(45) Date of Patent: Nov. 17, 2009

(54) GRAPHICAL ASSIGNMENT OF OBJECT BEHAVIORS

(75) Inventors: Douglas S. Benson, Plano, TX (US); Dennis E. Griffin, Mission Viejo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1215 days.

(21) Appl. No.: 10/001,212

(22) Filed: Oct. 25, 2001

(51) Int. Cl.
*G06F 3/048* (2006.01)

(52) U.S. Cl. .................. 715/838; 715/763; 715/835; 715/836; 715/837

(58) Field of Classification Search .......... 345/763, 345/762, 810, 811, 813, 745; 715/763, 835–838
See application file for complete search history.

(56) References Cited

U.S. PATENT DOCUMENTS

| 5,652,714 A * | 7/1997 | Peterson et al. ............... 702/57 |
| 6,230,174 B1 * | 5/2001 | Berger et al. ................. 715/513 |
| 6,356,867 B1 * | 3/2002 | Gabai et al. .................. 704/270 |
| 6,538,673 B1 * | 3/2003 | Maslov ....................... 345/853 |
| 6,769,015 B1 | 7/2004 | Bates et al. |
| 2001/0020952 A1 * | 9/2001 | Iwasaki ...................... 345/704 |

OTHER PUBLICATIONS

Lowery, Joseph et al., Using Drag-and-Drop Behaviors, Fireworks 4 Bible, 2001, pp. 688-691, Hungry Minds, Inc., New York, New York, USA.
U.S. Appl. No. 10/001,213, Benson, et al.

* cited by examiner

*Primary Examiner*—Sara M Hanne (57) ABSTRACT

A system for intuitively associating behaviors with objects. The script or code defining those behaviors may then be automatically generated. The generated script or code is downloadable to a client system. The intuitiveness may involve gestures, such as dragging and dropping, between a source object and itself or between a source object and a destination object, that preferably assigns a behavioral association with objects without the requirement of knowing any specific programming or scripting language.

37 Claims, 4 Drawing Sheets

1000 — DEVELOPER SELECTING AN OBJECT OF A FILE WITHIN A WORKSPACE

1001 — THE APPLICATION GRAPHICALLY DISPLAYING A CONTROL ICON FOR THE SELECTED OBJECT

1002 — DEVELOPER DRAGGING THE CONTROL ICON TO A DESIRED TARGET OBJECT WITHIN THE FILE

1003 — THE APPLICATION DISPLAYING AN ASSOCIATION INDICATOR REFERENCING THE SELECTED OBJECT AND THE TARGET OBJECT

1004 — THE APPLICATION ASSIGNING THE SELECTED BEHAVIOR TO THE SOURCE OBJECT

1005 — THE APPLICATION GENERATING A COMPUTER-READABLE SCRIPT TO DEFINE THE ASSOCIATIONS BETWEEN THE SELECTED OBJECT, THE TARGET OBJECT, AND THE SELECTED BEHAVIOR

1006 — DEVELOPER SELECTING AN EXPORT COMMAND TO EXPORT THE COMPUTER-READABLE SCRIPT FILE

1007 — USER SELECTING TO VIEW THE EXPORTED FILE

1008 — THE USER'S COMPUTER DISPLAYING THE SELECTED BEHAVIOR AS ASSOCIATED TO THE SELECTED AND TARGET OBJECTS BY EXECUTING THE SCRIPT GENERATED BUY THE APPLICATION

GRAPHICAL ASSIGNMENT OF OBJECT BEHAVIORS

RELATED APPLICATION

The present application is related to co-pending and commonly assigned U.S. patent application Ser. No. 10/001,213, entitled "GRAPHICAL INSERTION OF JAVASCRIPT POP-UP MENUS", concurrently filed herewith, the disclosure of which is hereby incorporated herein by reference.

BACKGROUND OF THE INVENTION

Associating objects with behaviors is well known throughout application development environments. Such association normally involves retrieving a menu listing multiple different possible behaviors, selecting a behavior that is both applicable and desired, selecting an object with which to associate the selected behavior, and, if needed, choosing another object that will be linked with the previously selected object's behavior. Upon eventual export of the created association to a user, the selected objects and behaviors generally function as defined by the host in the association process. Typical behaviors that may be used in the association include loading an image object when a user's mouse or pointing device points at or "rolls over" another image. Another typical behavior may be sending a user to another location when clicking a certain object, or playing a sound through the user's speakers when an object is rolled over. Other behaviors listed in the menu may include altering the status bar of a user's browser or displaying a JavaScript dialog.

In MACROMEDIA INC.'S FIREWORKS™, a web graphics development environment that is capable of performing these associations, a developer typically uses the behavior panel, which lists multiple behaviors that may be attached to an object, such as a hotspot or slice, to select a behavior for that object. A behavior is a combination of an event with an action triggered by that event. A hotspot is an area defined by a developer within an image that defines an area in which an action will occur or will be expected to occur. A slice is also an area, available in applications such as FIREWORKS™, that can be defined, selected, and moved during the creation of a web page, and which defines how an image will be split or sliced into multiple images upon being exported. First, the developer usually selects a hotspot, or slice object, and then selects a behavior from the behavior panel. Once the behavior is selected, the developer must typically then choose from various options in a dialog specific to that behavior. The system generally proceeds to associate the designated behavior to that object. This behavior association is often used in what are known as disjoint roll overs, in which a user rolling over a slice or hotspot in one region of an HTML page changes an image in another region of the HTML page.

Associating behaviors in this manner is often a time consuming process. This time consumption is usually even more evident when the developer is associating a number of objects with a number of behaviors. Using the existing methods, the developer is generally required to define extensive details concerning when and where each behavior should take effect.

It should be noted that the term "user" is used herein to represent the user of a web page or other interactive file after that file has been developed/created and then placed in a user-accessible area. In contrast, a "developer" or "creator" is the person or group of people who develop/create the web page or other interactive file using application development environments.

BRIEF SUMMARY OF THE INVENTION

The present invention is directed to a system and method which preferably enables a developer or application creator to intuitively associate objects with behaviors without requiring the extensive use of a behaviors' panel, without requiring the developer to define the details of a behavior after selecting the object that will be associated with the behavior, without requiring the developer to define the target object in a separate dialog, and without requiring the developer or creator to actually code or program the association in a computer-readable programming or scripting language. Various embodiments of the present invention provide a system for intuitively defining behaviors associated with objects, wherein the computer-readable scripts or programs that defines the behaviors are preferably automatically generated. The automatically generated script or program is then capable of being exported from the developer's system to a user-accessible region, from which the user may download or access the exported file with the user's system. The intuitive methods of relating a source object with a destination involves performing a special gesture indicating a behavior associated to the source object. In associating some behaviors, such as a disjoint roll over, the gesture may include illustrating a relationship between the source object and a destination object, at which the behavior will perform some function. The gesture used to graphically relate a behavior to the object or objects may include simply dragging and dropping, but also may comprise other means, such as the use of modifier keys and mouse clicks to designate the object or objects that will be used in associating and implementing the behavior.

This invention may be used in web-related development environments, such as MACROMEDIA INC.'S FIREWORKS™, an advanced graphics application optimized for developing graphics suitable for web page applications, to associate objects with their desired behaviors. For example, FIREWORKS™ may preferably allow a developer to designate a slice or other hotspot using the mouse or other pointing device. The creator or developer may then preferably drag a special graphical control icon or handle to a designated hotspot or slice or may drag the graphical control from a designated hotspot or slice to another location or object. The gestures preferably result in the system recognizing that the developer is creating a behavior relationship with the designated slice or hotspot and itself or to another object and, thus, allows the developer to select key properties utilized in defining the desired relationship. Depending on what type of object is selected or if the control icon is manipulated between two or more hotspots or slice objects, a different behavior or, additionally and/or alternatively, a list of potential behaviors may be presented to the developer according to which behaviors are accessible by or relevant to the selected objects.

Alternatively, a tool or tool palette may be provided allowing the developer to select a desired behavior-specific tool and then perform some gesture associating an object or objects with the assigned behavior specific to the selected tool.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
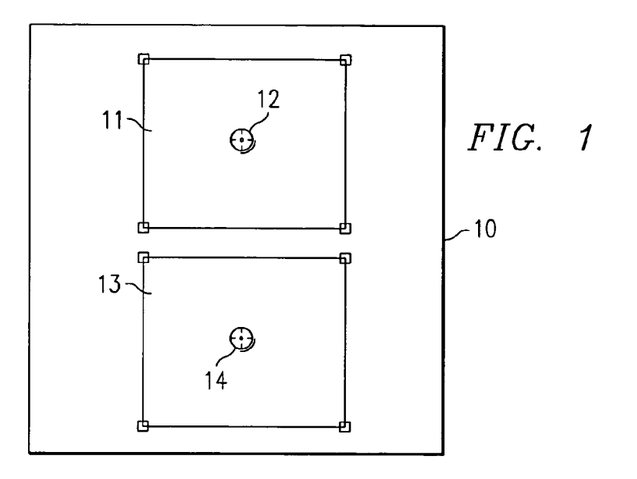
FIG. 1 illustrates exemplary objects within a workspace of an application implementing a preferred embodiment of the present invention.

FIG. 1 illustrates exemplary object elements of a preferred embodiment of the present invention. Window 10 defines the workspace of the application. Within window 10 are object 11 and slice 13. Object 11 comprises a graphical object, such as a hotspot or slice, situated within window 10, while slice 13 comprises another area that is defined within window 10. Object 11 contains behavior tool 12, while slice 13 contains behavior tool 14.

Figure 2:
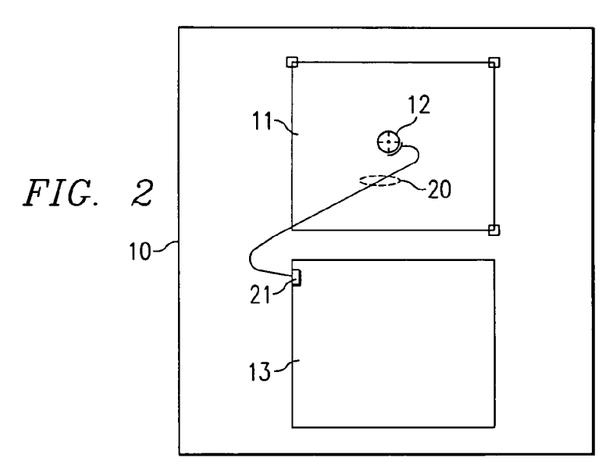
FIG. 2 illustrates a further set of exemplary objects within a workspace of an application implementing a preferred embodiment of the present invention.

Turning now to FIG. 2, which further illustrates exemplary object elements of the present invention, a developer/creator may desire to create a behavior assignment that is defined with a source and target objects, such as a disjoint roll over. To implement such a two-object behavior, a creator may preferably click and hold on behavior tool 12 of object 11. By dragging behavior tool 12 toward slice 13, line 20 appears, starting at the origination point of behavior tool 12 and proceeding in the general direction of the dragging. When the developer releases the mouse button over slice 13, line 20 preferably terminates and snaps into place at connection indicator 21, graphically connecting behavior tool 12 of object 11 with slice 13.

Figure 3:
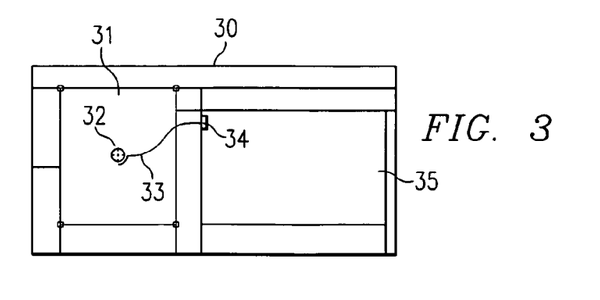
FIG. 3 illustrates a further set of exemplary objects within a workspace of an application implementing a preferred embodiment of the present invention.

FIG. 3 illustrates the functionality of one implementation of the present invention through various objects depicted within window 30. hotspot 31, with behavior controller 32, is the source object. To assign a behavior relating hotspot 31 to slice 35, the creator preferably clicks and drags behavior controller 32 over slice 35. Upon releasing the mouse button or other similar pointing device switch, connection indicator 33 preferably appears and snaps into place, graphically connecting behavior controller 32 with slice 35. In this example, connection indicator 33 also terminates at termination box 34 within slice 35. In alternative embodiments, connection indicator 33 may end directly at slice 35. Additionally, connection indicator 33 may end within the center of slice 35, and may or may not terminate at termination box 34.

In the example describing FIG. 3, the preferred embodiment shown assigns the default behavior of a roll over to the drag and drop process previously described. Thus, as the creator releases the mouse button, triggering the appearance of connection indicator 33, interaction interface 40, shown in FIG. 4, preferably appears to the creator. Interaction interface 40 allows the creator to select from several possible images or the like to be swapped into slice 35, the target panel shown in FIG. 3, in furtherance of the associated default roll over behavior. The roll over behavior depicted in interaction interface 40 is a behavior in which an original frame with one image is swapped out with a second frame having another image chosen by the creator.

A frame is an image or area in which an image may be created and displayed within a file or within an object or slice. Frames are typically used in animations; each frame depicts one image in the overall animation, analogous to film. A roll over or image swap is analogous to an animation with at least two different frames usually displaying two different images. Thus, as referring back to FIG. 3, if a user passes over the hotspot 31, an image taken from a subsequent frame will be swapped into slice 35 in place of the image on the original frame therein. Scrolling through frame selector 41 (FIG. 4), a creator may choose the specific frame or image to be swapped when the roll over action occurs over the source object.

It should also be noted that in alternative embodiments of the present invention, the inventive system may automatically choose one behavior from multiple possible behaviors to assign to the selected object or objects. Such an alternative embodiment may preferably use a pre-determined or calculated preference list that is assembled using such items as statistical formulas or a history list which saves the most recent behavior chosen or selected by the developer.

In further alternative embodiments of the present invention, a developer may be given a choice to select between a list of relevant applicable behaviors upon release of a mouse button or the actuation of another alternative action, such as a right-button mouse click or depressing a modifier key with another action.

Figure 5:
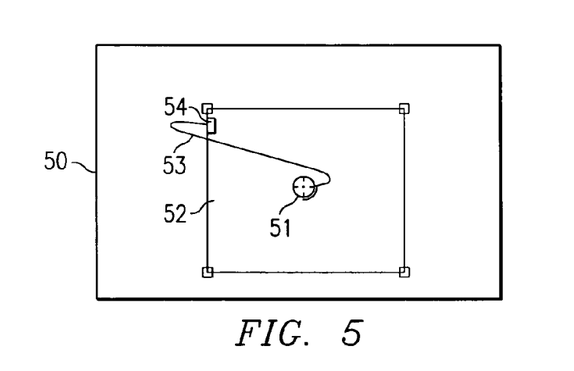
FIG. 5 illustrates an exemplary object within a workspace of an application implementing associated to itself according to a preferred embodiment of the present invention.

FIG. 5 illustrates a simple behavior assignment wherein a behavior is assigned from the source to itself. The workspace defined by window 50 comprises slice 52, containing control icon 51. In order to assign a behavior to slice 52, the creator preferably clicks and drags control icon 51 and release the mouse button within slice 52. Upon dragging and releasing control icon 51 within slice 52, line connector 53 preferably appears, graphically connecting control icon 51 with slice 52. In this example, the alternative embodiment of the present invention allows the creator or developer to select from a list of relevant applicable behaviors after establishing the graphical connection between the objects. The creator/developer may preferably assign a behavior, such as a roll over behavior, a sound effect behavior, or a behavior that adds a text message in the status bar of a web browser when a user rolls over or selects a slice, such as slice 52. Behaviors may also include a combination of multiple behaviors. The assigned behaviors may preferably be assigned both to and from a one or many hotspots, slices, objects, or regions. Thus, using the example of a sound effect, as a user rolls over or selects slice 52, a sound effect, such as a click or bell, may be played from the user's computer.

Figure 4:
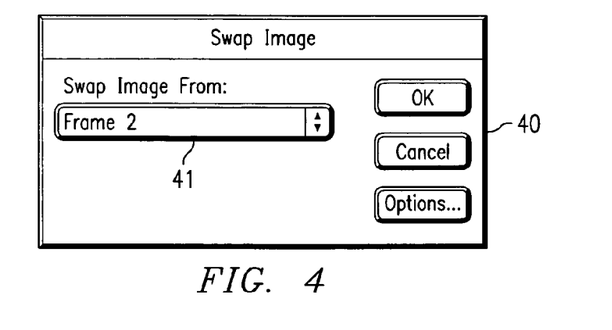
FIG. 4 illustrates a dialog box with a selectable list of frames containing images that can be swapped in a swap-image/roll over behavior.
Figure 6:
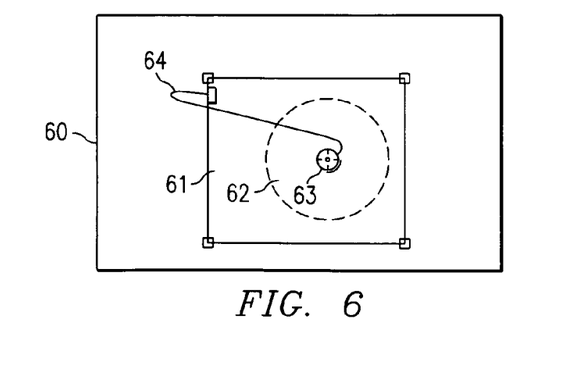
FIG. 6 illustrates a further set of exemplary objects within a workspace of an application implementing a preferred embodiment of the present invention.

An alternative implementation of the present invention may allow a behavior to be assigned between a hotspot or slice defined within another hotspot or slice. Window 60 of FIG. 6 holds hotspot 62. Hotspot 62 contains control handle 63. Hotspot 62 is shown superimposed upon slice 61. Clicking and dragging control handle 63 from hotspot 62 onto slice 61 preferably assigns a behavior between hotspot 62 and slice 61. Upon the release of the mouse button, line indicator 64 preferably appears graphically connecting hotspot 62 with slice 61. Using the interaction interface 40 illustrated in FIG. 4, the developer may then preferably select a new frame to be swapped when a user rolls over hotspot 62, thus using the functionality as shown in FIG. 4. As the mouse rolls over hotspot 62, the image of the initial frame within slice 61 is swapped with the next frame having another image that has been selected by the developer.

Figure 7:
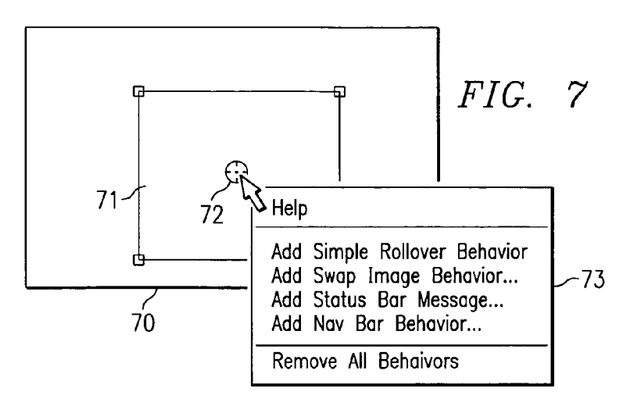
FIG. 7 illustrates an alternative embodiment of the present invention using a dialog box.

It should be noted that the present invention is not limited to dragging and dropping a control icon or handle in order to establish a connection between different objects of a window, or establishing or reassigning different behaviors between objects. FIG. 7 illustrates such an alternative embodiment of the present invention which provides a different method of creating an object-behavior relationship. Within window 70, hotspot 71 contains format icon 72. Upon clicking format icon 72, menu 73 appears, offering the developer various actions that may be performed. Depending on the selection made, the developer may move the mouse, or other type of pointing device, over an object, hotspot, slice or the like, intended as the target and click on the designated target area. In this alternative method described in FIG. 7, the present invention preferably recognizes that a behavior is to be assigned between hotspot 71 and the additional object. Thus the developer is instructed to click the object, area, hotspot or other slice within window 70 in order to establish or assign a behavior between hotspot 71 and the target object. Upon release of the mouse button, a line indicator is preferably drawn between hotspot 71 and the target object the user has selected.

It should be noted that in alternative embodiments of the present invention, the drag and drop method of gesturing to establish a relationship with and object or objects may trigger a menu, such as menu 73, to appear offering a plurality of behaviors relevant to the selected object or objects to the developer for selection. In such an alternative embodiment, the system does not automatically assign a default behavior to the behavior assignment process.

It should further be noted that in alternative embodiments of the present invention, mechanisms other than frames may be used to specify images to use within behaviors. For example, layers may be used rather than frames. Alternatively, existing images such as JPEG, GIF, or the like, may be specified rather than frames.

Figure 8:
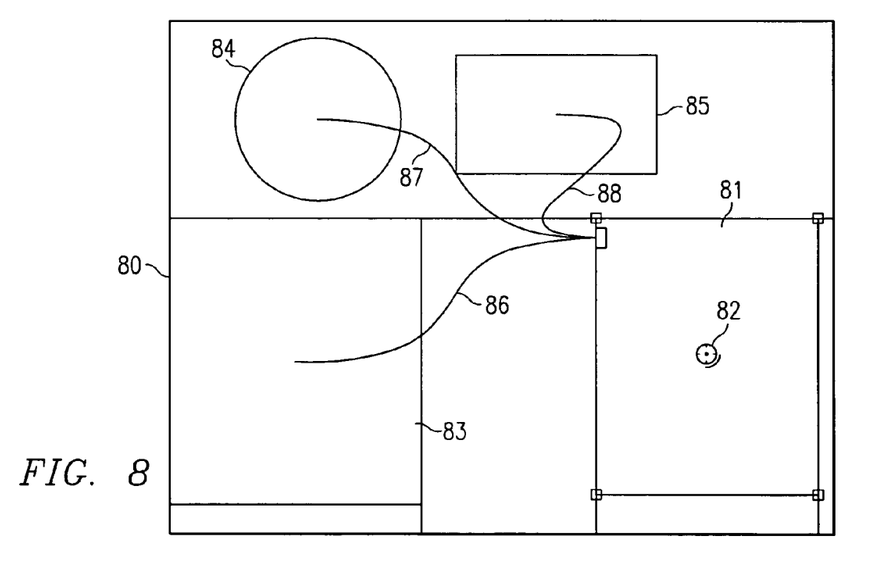
FIG. 8 illustrates a further set of exemplary objects within a workspace of an application implementing a preferred embodiment of the present invention.

It should further be noted that embodiments of the present invention are useful not only in the assignment of behaviors for different objects within an initial creation or development process, but are also useful in editing a pre-existing window or web file. FIG. 8 illustrates the use of the present invention with the editing of a pre-existing window. Window 80 contains several different image objects, destination slice 81, slice 83, hotspot 84, and object 85. A developer editing a file within the workspace of window 80 may highlight one of the objects displayed within window 80. Upon selecting the object, all graphical connection lines going into and out of the selected slice, hotspot, or object are preferably displayed to the developer. For example, if the developer selects slice 83, connector line 86 preferably appears graphically illustrating the connection between slice 83 and destination slice 81. Destination slice 81 includes control indicator 82 and shows slice 83 as the source of the behavior assigned to destination slice 81. Likewise, if the creator selects destination slice 81, all graphical connection lines coming into or out of destination slice 81 are preferably illustrated and presented to the user. For example, upon selection of destination slice 81, connector lines 86, 87 and 88 each preferably depict the behavioral assignments between destination slice 81 and slice 83, hotspot 84 and object 85. This facilitates determining which objects within window 80 are connected or have behaviors assigned with other objects within window 80.

Figure 9:
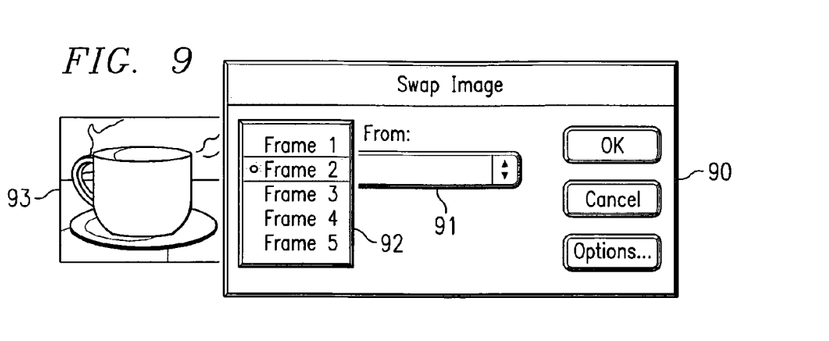
FIG. 9 illustrates an exemplary dialog with a preview image.

The present invention may also preferably allow a developer to preview the image or frame that may be selected for swapping in a roll over behavior assignment. FIG. 9 illustrates such an alternative embodiment of the present invention. Dialog box 90 is presented after associating the source object with the target object. Using frame selector 91, the creator may scroll through frame options within selection box 92. Highlighting any one or more of the selected frame or image selections preferably displays a preview of the highlighted frame or image in preview windoid 93. A windoid is a small window that may be an inset window contained within dialog box 90. The preview may also be displayed in a full window or directly within the document.

Referring back to FIG. 2, in an alternative embodiment of the present invention, a creator may change the assignment of a particular behavior between objects by clicking and holding onto termination point 21 and dragging termination point 21 to the new or different target object. Using the objects displayed in FIG. 2, a user may click and drag termination point 21 back onto object 11 in order to assign a behavior from object 11 to itself. In that manner, the user may preferably graphically change the assignments or the relationships that have been assigned between multiple objects within the workspace window.

Figure 10:
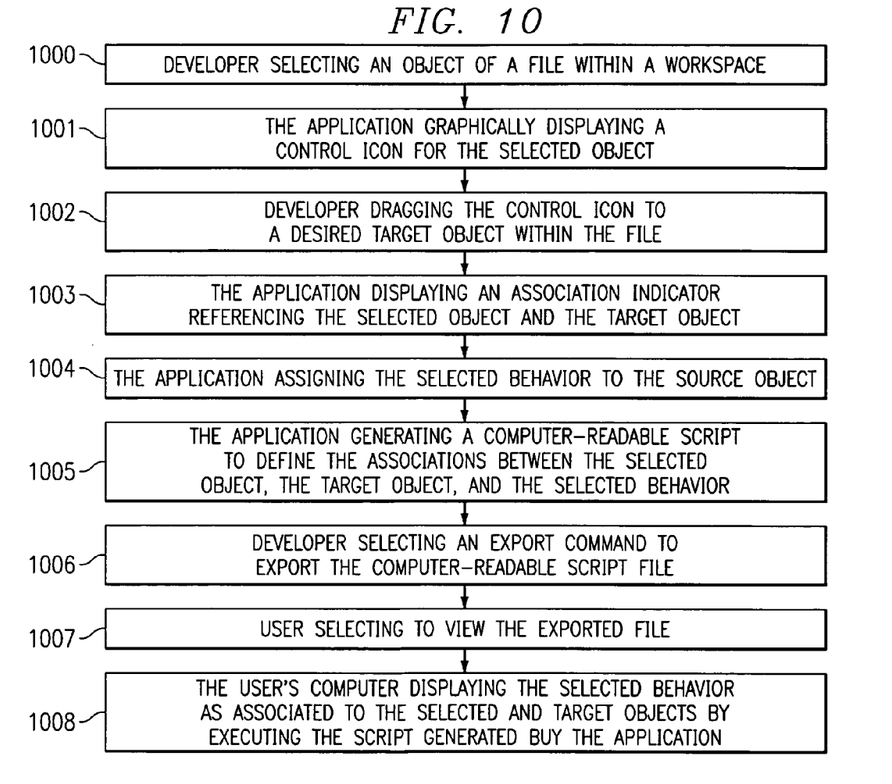
FIG. 10 is a flow chart illustrating the typical steps performed in implementing a preferred embodiment of the present invention.

FIG. 10 presents a flow chart describing the steps typically used to implement a preferred embodiment of the present invention. In step 1000, the developer selects an object within a file. In step 1001, the application implementing the preferred embodiment of the present invention preferably graphically displays a control icon for the selected object. As noted in the examples above, the control icon may preferably be displayed as a part of the object or may be presented on a palette selectable by the developer. The developer may preferably drag or gesture the control icon to itself or a desired target object within the file, in step 1002. In step 1003, the application will then preferably display an association indicator, such as a dotted or specially colored line, to the developer that shows the association between the selected object and the target object. In step 1004, the application automatically assigns a desired behavior to the target object.

As the developer finishes the creation or development of the web page or interactive file, the application generates a computer-readable script or program that defines the associations between the selected object, the target object, and the assigned behavior, in step 1005. It should be known that script/code generators that generate script and/or code from application-specific commands are well known in the art. In step 1006, the developer may select an export option to export the web page or interactive file, including the computer-readable script or program to a server or accessible location. In step 1007, a user selects to view the exported web page or interactive file. The user's computer, using the web page or interactive file with the computer-readable script or code, executes the script and displays the selected behavior as associated between the selected and target objects in step 1008.

It should be noted that the developer is able to preview the functionality of all assigned behaviors within the application development environment without first having to trigger the script or program to be automatically generated. In preferred embodiments of the present invention, the implementing development environments would preferably be able to simulate the exact execution of each behavior assignment.

It should be noted that the coding and scripting techniques used to implement the different user interface aspects of the present invention are various and well known in the art. It would be within the knowledge and capability of one skilled in the art of programming to implement the present invention as described in the example embodiments described herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for associating behaviors with objects, wherein a script for said behaviors is automatically generated and is accessible by a client from a host, said system comprising:
   a source object;
   a graphical behavior tool rendered as a part of said source object for establishing a behavior relationship between said source object and a target by using a pointer to perform a gesture with said graphical behavior tool; and
   an automated script generator for generating computer readable script defining said behavior relationship.

2. The system of claim 1 wherein said gesture comprises: dragging said graphical behavior tool from said source object to said target.

3. The system of claim 2 wherein said source object and said target are a same object.

4. The system of claim 1 wherein said gesture comprises:
   actuating a selector button on a pointing device pointed on said graphical behavior tool, wherein said gesture triggers a behavior menu allowing for selection of relevant behaviors between said source object and target.

5. The system of claim 4 wherein said source object and said target are a same object.

6. The system of claim 1 wherein said gesture comprises:
   selecting a modifying button in conjunction with a second action, wherein said second action comprises one of:
   dragging said pointer; and
   actuating a selector button on a pointing device controlling said pointer.

7. The system of claim 1 further comprising:
   at least one link line visually joining said source object and said target, said at least one link line visibly expressing said behavior relationship between said source object and said target.

8. The system of claim 7 wherein:
   deleting at least one of said at least one link line removes said behavior relationship between said source object and said target.

9. The system of claim 7 wherein:
   relocating at least one of said at least one link line to a different target transfers said behavior relationship from said source object and said target to said source object and said different target.

10. The system of claim 1 wherein said behavior is a default behavior assigned by said system.

11. The system of claim 1 wherein said behavior is automatically chosen by said system using one of:
    a preset list of behaviors;
    a historical list of behaviors; and
    a statistical list of most selected behaviors.

12. The system of claim 1 wherein said graphical behavior tool is rendered as a part of said source object responsive to a user selecting said source object.

13. A method of assigning a behavior to a trigger object comprising the steps of:
    gesturing a control handle rendered as a part of said trigger object with a pointer from said trigger object to a destination;
    associating a behavior between said trigger object and said destination responsive to said gesturing step;
    automatically generating said script defining said association.

14. The method of claim 13 wherein said trigger object and said destination are the same.

15. The method of claim 13 further comprising the step of:
    displaying a behavior menu allowing for the selection of behaviors for assignment to said trigger object.

16. The method of claim 13 wherein said step of gesturing said control handle comprises the step of:
    capturing a dragging of said control handle displayed on said trigger object from said trigger object to said destination.

17. The method of claim 13 wherein said step of gesturing said control handle comprises the step of:
    capturing a button activation of a pointing device controlling said pointer pointing to said control handle.

18. The method of claim 13 wherein said step of gesturing said control handle comprises the step of:
    capturing an actuation of a modifier key; and
    one of:
    capturing a dragging of said pointer; and
    capturing a button activation of a pointing device controlling said pointer.

19. The method of claim 13 further comprising the step of:
    visually depicting said association between said trigger object and said destination via at least one line connecting said trigger object and said destination.

20. The method of claim 19 further comprising the step of:
    deleting said association by deleting said at least one line.

21. The method of claim 20 further comprising the step of:
relocating said association from said trigger object and said destination to a different destination by relocating at least one of said at least one line to said different destination.

22. The method of claim 13 further comprising the step of: automatically assigning a default behavior.

23. The method of claim 13 further comprising the step of: automatically selecting said behavior from a plurality of behaviors.

24. The method of claim 23 wherein said automatically selecting step comprises one of the steps of:
following a predefined sequence of selections from said plurality of behaviors;
selecting a recently selected behavior; and
calculating a statistically most likely behavior using data from previous behavior selections.

25. The method of claim 13 wherein said control handle is rendered as a part of said trigger object responsive to a user selecting said trigger object.

26. A system for defining an associated behavior between a source object and a destination object comprising:
means for gesturing a control icon rendered as a part of said source object with a pointer from said source object to said destination object, wherein said control icon is displayed on said source object;
means for associating a behavior between said source object and said destination object responsive to said means for gesturing;
means for automatically generating a downloadable script defining said associated behavior.

27. The system of claim 26 wherein said source object and said destination object are the same.

28. The system of claim 26 further comprising:
means for visually depicting an association between said source object and said destination object by graphically rendering at least one link line connecting said source object and said destination object.

29. The system of claim 28 further comprising:
means for deleting said associated behavior by visually deleting said at least one link line.

30. The system of claim 29 further comprising:
means for relocating the behavior relationship from said source object and said destination object to a different destination object through means for relocating at least one of said at least one link line to said different destination object.

31. The system of claim 26 further comprising:
means for rendering said control icon as a part of said source object responsive to a user selecting said source object.

32. A computer program product having a computer readable medium with computer program logic recorded thereon for assigning a behavior to a selected object, said computer program product comprising:
code for graphically displaying a control icon as a part of said selected object;
code for capturing a developer dragging said control icon with a pointer from said selected object to a target object;
code for graphically rendering an association indicator referencing an association between said selected object and said target object responsive to said developer dragging;
code for assigning said behavior to said selected object; and
code for autonomously generating a computer-readable code defining said assigned behavior.

33. The computer program product of claim 32 wherein said code for assigning said behavior includes:
code for graphically displaying an interactive interface to said developer for selecting said behavior; and
code for capturing a user designating said behavior to assign to said target object.

34. The computer program product of claim 32 wherein said code for assigning includes:
code for automatically selecting said behavior responsive to a set of parameters.

35. The computer program product of claim 34 wherein said set of parameters comprises at least one of:
a preset list of behaviors;
a historical memory that stores a last behavior assigned; and
a statistical algorithm for predicting a desired behavior from a list of available behaviors.

36. The computer program product of claim 32 wherein said code for assigning includes:
code for automatically selecting a default behavior.

37. The computer program product of claim 32 wherein said code for graphically displaying is executed responsive to a user selecting said selected object.

* * * * *

UNITED STATES PATENT AND TRADEMARK OFFICE
CERTIFICATE OF CORRECTION

PATENT NO. : 7,620,912 B1  Page 1 of 1
APPLICATION NO. : 10/001212
DATED : November 17, 2009
INVENTOR(S) : Benson et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (1215) days Delete the phrase "by 1215 days" and insert -- by 1334 days --

Signed and Sealed this

Seventeenth Day of August, 2010

David J. Kappos
*Director of the United States Patent and Trademark Office*